US012766760B2

(12) United States Patent
Nomoto

(10) Patent No.: US 12,766,760 B2
(45) Date of Patent: Oct. 20, 2026

(54) MANUFACTURING METHOD OF WAFER

(71) Applicant: DISCO CORPORATION, Tokyo (JP)

(72) Inventor: Asahi Nomoto, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 86 days.

(21) Appl. No.: 18/947,611

(22) Filed: Nov. 14, 2024

(65) Prior Publication Data

US 2025/0187230 A1 Jun. 12, 2025

(30) Foreign Application Priority Data

Dec. 6, 2023 (JP) ................................ 2023-206430

(51) Int. Cl.

| | |
|---|---|
| ***B28D 5/00*** | (2006.01) |
| ***B23K 26/0622*** | (2014.01) |
| ***B23K 26/067*** | (2006.01) |
| ***B23K 26/53*** | (2014.01) |
| *B23K 103/00* | (2006.01) |

(52) U.S. Cl.

CPC ........ *B28D 5/0011* (2013.01); *B23K 26/0622* (2015.10); *B23K 26/067* (2013.01); *B23K 26/53* (2015.10); *B28D 5/0052* (2013.01); *B23K 2103/56* (2018.08)

(58) Field of Classification Search

CPC .......................... B25D 5/0011; B25D 5/0052; B23K 26/0622; B23K 26/53; B23K 26/067

See application file for complete search history.

(56) References Cited

U.S. PATENT DOCUMENTS

| | | | | |
|---|---|---|---|---|
| 2020/0398381 | A1* | 12/2020 | Richter | B23K 26/53 |
| 2021/0323098 | A1* | 10/2021 | Nomoto | B23K 26/402 |
| 2022/0339740 | A1* | 10/2022 | Bernard | B23K 26/53 |
| 2022/0390757 | A1* | 12/2022 | Wani | B23K 26/062 |
| 2022/0410305 | A1* | 12/2022 | Genda | B23K 26/0006 |
| 2022/0410320 | A1* | 12/2022 | Iizuka | B23K 26/53 |
| 2023/0050807 | A1* | 2/2023 | Iga | H10P 54/00 |
| 2023/0102150 | A1* | 3/2023 | Masuda | H10P 54/00 225/2 |

(Continued)

FOREIGN PATENT DOCUMENTS

JP 2011084469 A 4/2011

*Primary Examiner* — Omar Flores Sanchez

(74) *Attorney, Agent, or Firm* — GREER BURNS & CRAIN, LTD.

(57) ABSTRACT

There is provided a manufacturing method of a wafer for manufacturing from a workpiece the wafer having a thickness smaller than the distance between a first surface and a second surface of the workpiece. The workpiece is an ingot of GaN or a single-crystal substrate of GaN. The method includes forming a separation layer in the workpiece by relatively moving, along a predetermined direction, the workpiece and the focal point of a pulsed laser beam transmitting through the workpiece in a state in which the first surface is irradiated with the laser beam and the focal point is positioned at a predetermined depth position in the workpiece, and separating the wafer from the workpiece by using the separation layer as the point of origin. The angle between a crystal orientation represented by $\langle 10\bar{1}0 \rangle$ and the predetermined direction in a (0001) plane is equal to or smaller than 10°.

16 Claims, 17 Drawing Sheets

(56) References Cited

U.S. PATENT DOCUMENTS

| | | | | |
|---|---|---|---|---|
| 2023/0249282 | A1* | 8/2023 | Sekiya | B23K 26/0622<br>29/558 |
| 2023/0373129 | A1* | 11/2023 | Honoki | B23K 26/70 |
| 2025/0010519 | A1* | 1/2025 | Hirata | B23K 26/53 |
| 2025/0112048 | A1* | 4/2025 | Maeda | H10P 34/42 |
| 2025/0187230 | A1* | 6/2025 | Nomoto | B28D 5/0052 |
| 2025/0205826 | A1* | 6/2025 | Hirata | B23K 26/53 |
| 2025/0256358 | A1* | 8/2025 | Seto | B28D 5/0011 |

* cited by examiner

MANUFACTURING METHOD OF WAFER

BACKGROUND OF THE INVENTION

Field of the Invention

The present invention relates to a manufacturing method of a wafer for manufacturing the wafer having a thickness smaller than a distance between a first surface and a second surface from a workpiece that is an ingot of gallium nitride or a single-crystal substrate of gallium nitride having the first surface and the second surface located on the opposite side to the first surface.

Description of the Related Art

Gallium nitride (GaN) is referred to as a wide-bandgap semiconductor and has a bandgap of substantially three times, compared with silicon (Si). Devices such as power devices and light-emitting diodes (LEDs) are manufactured by using this comparatively large bandgap of GaN. In general, a single-crystal substrate (namely, wafer) of GaN is manufactured by slicing an ingot of GaN. For the manufacturing of the wafer, for example, a circular annular slicer in which a cutting blade is disposed at not an outer circumferential portion but an inner circumferential portion is used (refer to Japanese Patent Laid-open No. 2011-84469).

However, the thickness of the cutting blade of the slicer is comparatively large (for example, 0.3 mm) with respect to the thickness of the wafer (for example, 0.15 mm). Thus, approximately 60% to 70% is discarded as the kerf loss per one wafer in the ingot of GaN. As above, using the cutting blade causes a comparatively high ratio (namely, discard rate) of the kerf loss to the sum of the kerf loss and the wafer and thus is uneconomical.

SUMMARY OF THE INVENTION

The present invention is made in view of such a problem and intends to reduce the kerf loss in manufacturing of a wafer of GaN from an ingot of GaN.

In accordance with an aspect of the present invention, there is provided a manufacturing method of a wafer for manufacturing the wafer having a thickness smaller than the distance between a first surface and a second surface from a workpiece that is an ingot of gallium nitride or a single-crystal substrate of gallium nitride having the first surface and the second surface located on the opposite side to the first surface. The manufacturing method of a wafer includes a holding step of sucking and holding the second surface of the workpiece, a separation layer forming step of, after the holding step, forming a separation layer in the workpiece by relatively moving, along a predetermined direction, the workpiece and a focal point of a pulsed laser beam having such a wavelength as to be transmitted through the workpiece in a state in which the first surface is irradiated with the laser beam from the opposite side to the second surface and the focal point is positioned at a predetermined depth position in the workpiece, and a separation step of separating the wafer from the workpiece by using the separation layer as a point of origin after the separation layer forming step. An angle formed between a crystal orientation represented by the following (1) and the predetermined direction in the separation layer forming step in a (0001) plane is equal to or smaller than 10°.

[Math. 1]

$$\langle 10\bar{1}0 \rangle \tag{1}$$

Preferably, the manufacturing method of a wafer further includes a circular annular processing step of forming the separation layer in an outer circumferential region of the workpiece by positioning the focal point at the predetermined depth position and executing irradiation with the laser beam in a circular annular manner along an outer circumferential edge of the workpiece after the holding step and before the separation layer forming step.

Further, preferably, in the separation layer forming step, after the workpiece and the focal point are relatively moved in a regular hexagonal manner along the predetermined direction, the focal point is moved toward the center of the workpiece in the radial direction and then the workpiece and the focal point are relatively moved in a regular hexagonal manner along the predetermined direction.

Moreover, preferably, in the separation layer forming step, a second direction orthogonal to a first direction is employed as the predetermined direction while the laser beam is split into a plurality of laser beams and the respective focal points of the plurality of laser beams are disposed to line up along the first direction.

Further, preferably, in the separation layer forming step, after the plurality of focal points are moved along the second direction, the plurality of focal points are moved along the second direction in a state in which the plurality of focal points are shifted along the first direction to partly overlap with a movement region including the locus of the movement of the plurality of focal points in the second direction as viewed from the first surface.

Moreover, preferably, the interval of the plurality of focal points that line up along the first direction is equal to or longer than 5 μm and is equal to or shorter than 20 μm in the separation layer forming step.

Further, preferably, the separation layer formed in the separation layer forming step includes a plurality of modified regions. An aspect ratio represented by (b/a) is equal to or higher than 0.5 and is equal to or lower than 3.0 in the case in which the interval between the plurality of modified regions formed to line up along the first direction is defined as a (μm) and the interval between the plurality of modified regions formed to line up along the second direction by relatively moving the plurality of focal points and the workpiece along the second direction is defined as b (μm).

Moreover, preferably, the laser beam applied to the workpiece in the separation layer forming step is applied to the workpiece in a burst mode.

In the manufacturing method according to the aspect of the present invention, the separation layer is formed in the workpiece by relatively moving, along the predetermined direction, the workpiece and the focal point of the pulsed laser beam having such a wavelength as to be transmitted through the workpiece in the state in which the focal point is positioned at the predetermined depth position in the workpiece (separation layer forming step). Then, the wafer is separated from the workpiece by using the separation layer as the point of origin (separation step). By using the laser beam, the thickness of the separation layer can be set to, for example, approximately 60 μm (namely, 0.06 mm). Thus, the kerf loss in the thickness direction of the workpiece can be reduced, compared with the case of using a cutting blade.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 8B is a diagram depicting a wafer separated from the ingot, and the like;

DETAILED DESCRIPTION OF THE PREFERRED EMBODIMENTS

Figure 1:
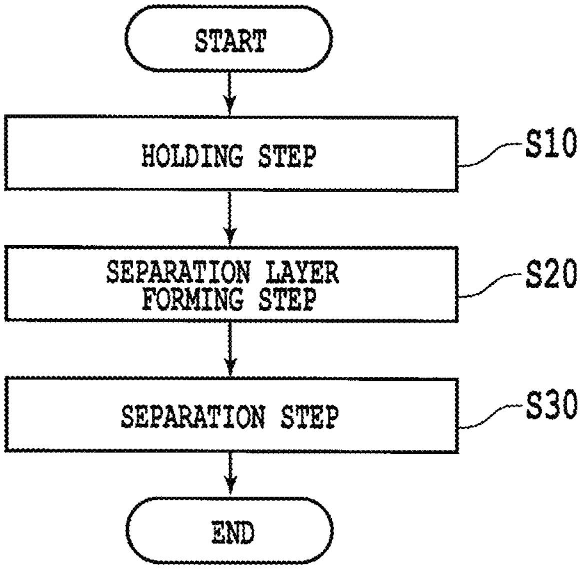
FIG. 1 is a flowchart of a manufacturing method.

Embodiments according to an aspect of the present invention are described with reference to the accompanying drawings. FIG. 1 is a flowchart of a manufacturing method for manufacturing, from an ingot (workpiece) 11 of GaN (see FIG. 2), a single-crystal substrate (namely, wafer 15) of GaN (see FIG. 8B) thinner than the ingot 11. In a first embodiment, the wafer 15 is manufactured by sequentially executing a holding step S10, a separation layer forming step S20, and a separation step S30 depicted in FIG. 1. First, the ingot 11 is described with reference to FIG. 2.

Figure 2:
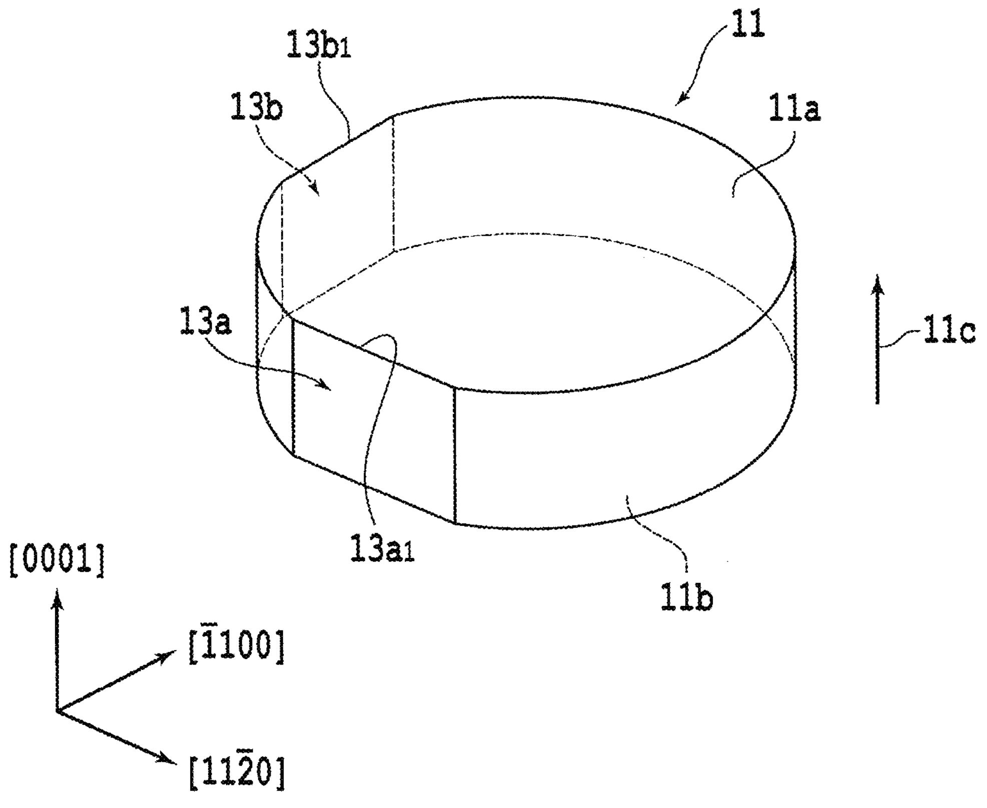
FIG. 2 is a perspective view of an ingot.

FIG. 2 is a perspective view of the ingot 11. The ingot 11 is a single crystal of GaN having a hexagonal crystal structure. The conductivity type of the ingot 11 is not particularly limited. The ingot 11 may be a p-type ingot containing a p-type impurity such as magnesium (Mg) or beryllium (Be) or be an n-type ingot containing an n-type impurity such as silicon (Si) or germanium (Ge).

The ingot 11 of the present embodiment has a diameter of 4 inches (approximately 100 mm) and a thickness of 500 μm. However, the diameter and the thickness are not limited to these values. The ingot 11 has a first surface 11*a* and a second surface 11*b* that is located on the opposite side to the first surface 11*a* in a thickness direction 11*c* and is parallel to the first surface 11*a*. The first surface 11*a* corresponds to the c-plane indicated in the following (2).

[Math. 2]

$$(0001) \tag{2}$$

In the present specification, the crystal plane and the crystal orientation are identified by using the Miller-Bravais indices. A specific crystal plane is represented by using ( ), and crystal planes equivalent to each other due to symmetry of the crystal structure are represented by using { }. Similarly, a specific crystal orientation is represented by using [ ], and crystal orientations equivalent to each other are represented by using < >.

The crystal orientation that is perpendicular to the first surface 11*a* (namely, c-plane) and is upward is represented by the following (3). This crystal orientation is referred to as the c-axis and corresponds to the thickness direction 11*c* of the ingot 11.

[Math. 3]

$$[0001] \tag{3}$$

The ingot 11 of the present embodiment has a plurality of flat surfaces in the side surface thereof. Specifically, the ingot 11 has a first side surface 13*a* and a second side surface 13*b* in such a positional relation as to be orthogonal to each other. The first side surface 13*a* corresponds to a crystal plane indicated in the following (4). The second side surface 13*b* corresponds to a crystal plane indicated in the following (5).

[Math. 4]

$$(\bar{1}100) \tag{4}$$

[Math. 5]

$$(11\bar{2}0) \tag{5}$$

A first orientation flat (hereinafter, abbreviated as first OF 13*a*$_1$) at which the first surface 11*a* intersects the first side surface 13*a* is parallel to a crystal orientation of the following (6).

[Math. 6]

$$[11\bar{2}0] \tag{6}$$

Further, a second orientation flat (hereinafter, abbreviated as second OF 13*b*$_1$) at which the first surface 11*a* intersects the second side surface 13*b* is parallel to a crystal orientation of the following (7).

[Math. 7]

$$[\bar{1}100] \quad (7)$$

Figure 3:
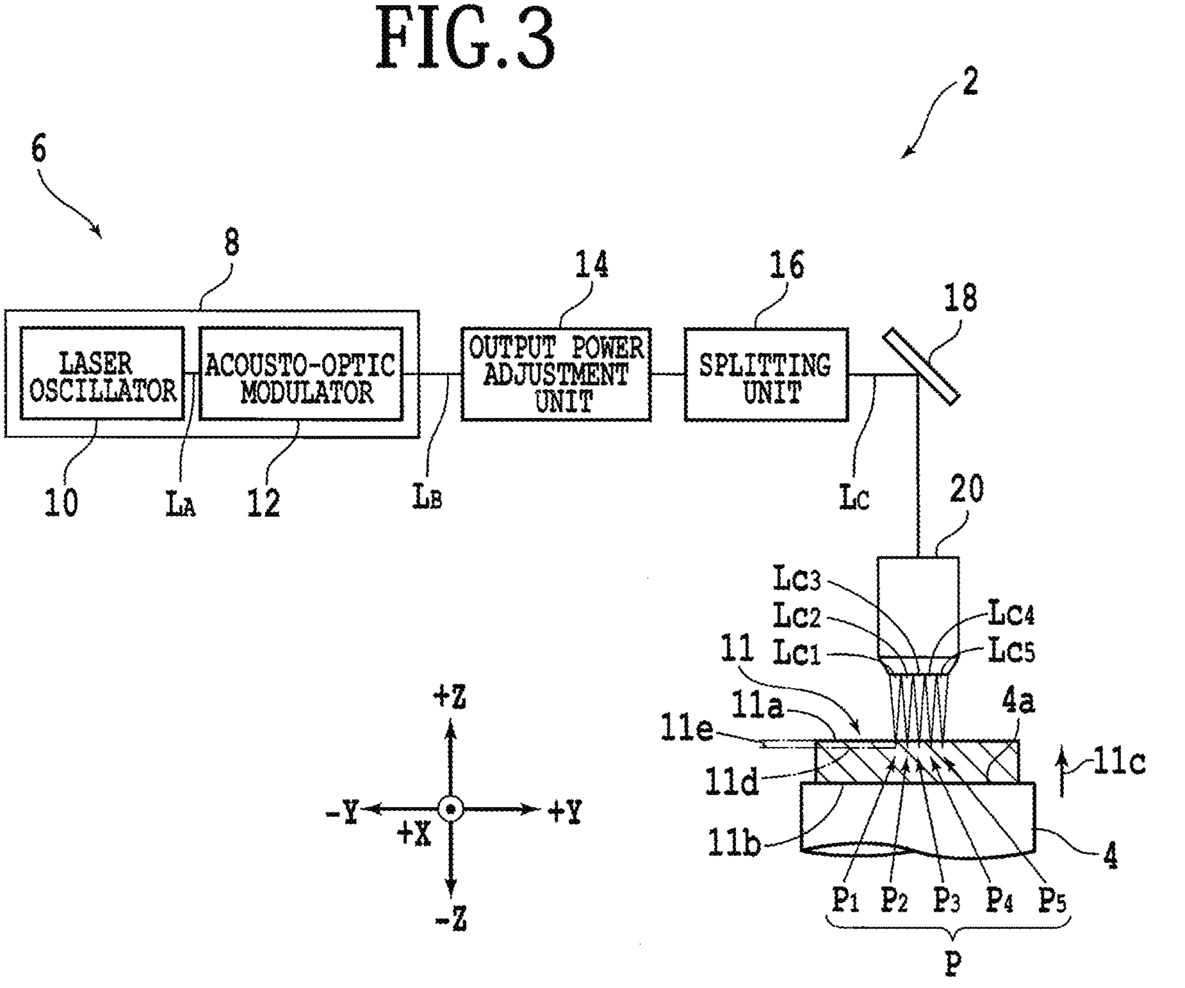
FIG. 3 is an outline diagram of a laser processing apparatus.

Next, a laser processing apparatus 2 for executing laser processing for the ingot 11 is described with reference to FIG. 3. FIG. 3 is an outline diagram of the laser processing apparatus 2. In FIG. 3, a plurality of constituent elements are depicted by functional blocks and simplified shapes. An X-axis direction (processing feed direction, second direction, predetermined direction), a Y-axis direction (indexing feed direction, first direction), and a Z-axis direction (height direction) depicted in FIG. 3 are orthogonal to each other.

In the present specification, the X-axis direction is parallel to a +X direction and a −X direction as opposite directions to each other. Similarly, the Y-axis direction is parallel to a +Y direction and a −Y direction as opposite directions to each other, and the Z-axis direction is parallel to a +Z direction and a −Z direction as opposite directions to each other.

The laser processing apparatus 2 has a chuck table 4 with a circular disc shape. The chuck table 4 has a frame body that is formed of a metal such as stainless steel and has a circular disc shape. A recess portion (not depicted) with a circular disc shape having a diameter smaller than that of the frame body is formed at a central portion of the frame body. A porous plate that is formed of a porous ceramic and has a circular disc shape is fixed to this recess portion.

A predetermined flow path (not depicted) is formed in the frame body, and a suction source (not depicted) such as a vacuum pump is connected to the predetermined flow path through a pipe portion (not depicted) or the like. When a negative pressure generated by the suction source is transmitted to the porous plate, the negative pressure is generated at the upper surface of the porous plate. The annular upper surface of the frame body and the circular upper surface of the porous plate are substantially flush with each other and are substantially flat, and function as a holding surface 4*a* for sucking and holding the ingot 11. The holding surface 4*a* is disposed in parallel to the XY plane.

A rotational drive mechanism (not depicted) that rotates the chuck table 4 is disposed at a lower portion of the chuck table 4. The rotational drive mechanism can rotate the chuck table 4 by any angle, with a predetermined rotation axis along the Z-axis direction being the rotation center. The chuck table 4 and the rotational drive mechanism are supported by a horizontal direction movement mechanism (not depicted). The horizontal direction movement mechanism includes an X-axis direction movement mechanism and a Y-axis direction movement mechanism each based on a ball screw system, and can move the chuck table 4 and the rotational drive mechanism along the X-axis direction and the Y-axis direction.

A laser beam irradiation unit 6 is disposed over the holding surface 4*a*. The laser beam irradiation unit 6 has a laser beam generation unit 8. The laser beam generation unit 8 includes a laser oscillator 10. For example, the laser oscillator 10 has Nd:YAG, Nd:$YVO_4$, or the like as a laser medium. From the laser oscillator 10, a pulsed (for example, several tens of MHz) laser beam $L_A$ having such a wavelength as to be transmitted through the ingot 11 of GaN (for example, 1064 nm) is emitted.

The laser beam $L_A$ emitted from the laser oscillator 10 is converted to a laser beam $L_B$ in a burst mode in an acousto-optic modulator (AOM) 12. The acousto-optic modulator 12 operates according to an electrical signal input to the acousto-optic modulator 12, and deflects the laser beam $L_A$ according to this signal for a predetermined time. Due to this, the laser beam $L_B$ obtained by the decimation of the laser beam $L_A$ for the predetermined time is emitted from the acousto-optic modulator 12 to an output power adjustment unit 14.

Figure 4A:
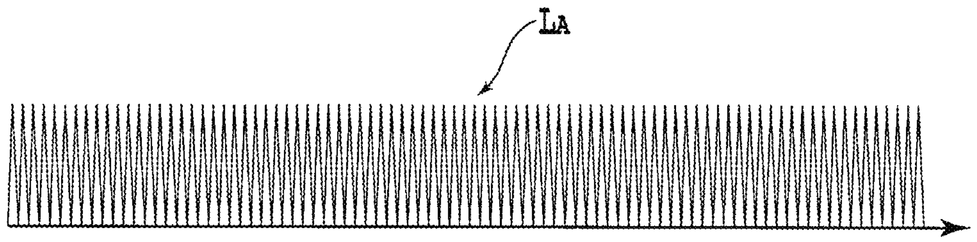
FIG. 4A is an outline diagram of a laser beam $L_A$.
Figure 4B:
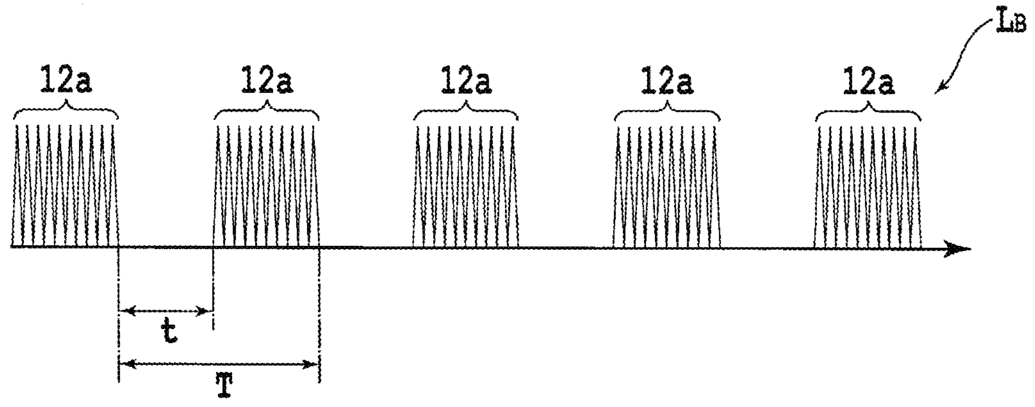
FIG. 4B is an outline diagram of a laser beam $L_B$.

FIG. 4A is an outline diagram of the pulsed laser beam $L_A$ incident on the acousto-optic modulator 12 from the laser oscillator 10. FIG. 4B is an outline diagram of the pulsed laser beam $L_B$ incident on the output power adjustment unit 14 from the acousto-optic modulator 12. In FIGS. 4A and 4B, the horizontal axis indicates the time, and the vertical axis indicates the magnitude of the output power.

The laser beam $L_A$ is converted, in the acousto-optic modulator 12, to the laser beam $L_B$ in the burst mode in which a pulse group 12*a* including a plurality of pulses is repeated at a predetermined cycle T as depicted in FIG. 4B. A time interval t corresponding to the interval between the pulse groups 12*a* is, for example, several tens of microseconds to several hundreds of microseconds. The reciprocal of the cycle T between the pulse groups 12*a* (namely, repetition frequency), set with the pulse group 12*a* being the unit of repetition, is 50 kHz, for example.

Referring back to FIG. 3, after the output power of the laser beam $L_B$ is adjusted to appropriate output power by the output power adjustment unit 14 including an attenuator and the like, the laser beam $L_B$ is spatially split by a splitting unit 16. The splitting unit 16 of the present embodiment has a liquid crystal on silicon-spatial light modulator (LCOS-SLM) (not depicted). However, a diffraction grating may be used instead of the LCOS-SLM.

A laser beam $L_C$ obtained through the splitting unit 16 passes through a collimator lens (not depicted), a mirror 18, and the like and is guided to an irradiation head 20. The irradiation head 20 has a collecting lens (not depicted). The collecting lens focuses the laser beam $L_C$ on a predetermined depth position in the ingot 11 sucked and held by the holding surface 4*a*.

The laser beam $L_C$ depicted in FIG. 3 is split into a plurality of laser beams $L_{C1}$, $L_{C2}$, $L_{C3}$, $L_{C4}$, and $L_{C5}$ by the splitting unit 16, and the respective focal points P ($P_1$, $P_2$, $P_3$, $P_4$, $P_5$) of the laser beams $L_{C1}$ to $L_{C5}$ are disposed to line up along the Y-axis direction at the predetermined depth position in the ingot 11.

The interval of the plurality of focal points P that line up along the Y-axis direction is set to a predetermined value of, for example, at least 5 μm and at most 20 μm. In the example depicted in FIG. 3, the number of branches of the laser beam $L_C$ is set to five for convenience of description. However, the number of branches is not limited to five. The number of branches may be at least two and at most 16. The number of branches in preferred one example is 10.

A casing (not depicted) of the laser beam irradiation unit 6 is provided with an imaging unit (not depicted) that images a subject. The imaging unit has a light emitting device (not depicted) that emits light downward along the Z-axis direction. The light emitting device includes a light emitting element such as a light emitting diode (LED) that functions as a light source. The imaging unit further has an imaging element (not depicted) that receives reflected light of light emitted from the light emitting device through a lens (not depicted).

The light from the light emitting device has the wavelength of a visible light beam. The imaging element is capable of photoelectric conversion of the wavelength of the light from the light emitting device. The imaging element is a charge-coupled device (CCD) image sensor, a complementary metal-oxide-semiconductor (CMOS) image sensor, or the like. The light emitting device, the lens, the imaging element, and the like configure a microscope camera unit that images a subject by visible light.

Operation of the above-described chuck table 4, rotational drive mechanism, horizontal direction movement mechanism, laser beam irradiation unit 6, and the like is controlled by a control unit that is not depicted. For example, the control unit is configured by a computer including a processor (processing apparatus) typified by a central processing unit (CPU) and a memory (storage apparatus). The memory includes a main storage apparatus such as a dynamic random access memory (DRAM), a static random access memory (SRAM), or a read only memory (ROM) and an auxiliary storage apparatus such as a flash memory, a hard disk drive, or a solid-state drive. Software including a predetermined program is stored in the auxiliary storage apparatus. Functions of the control unit are implemented by causing the processing apparatus and the like to operate according to this software.

Figure 5:
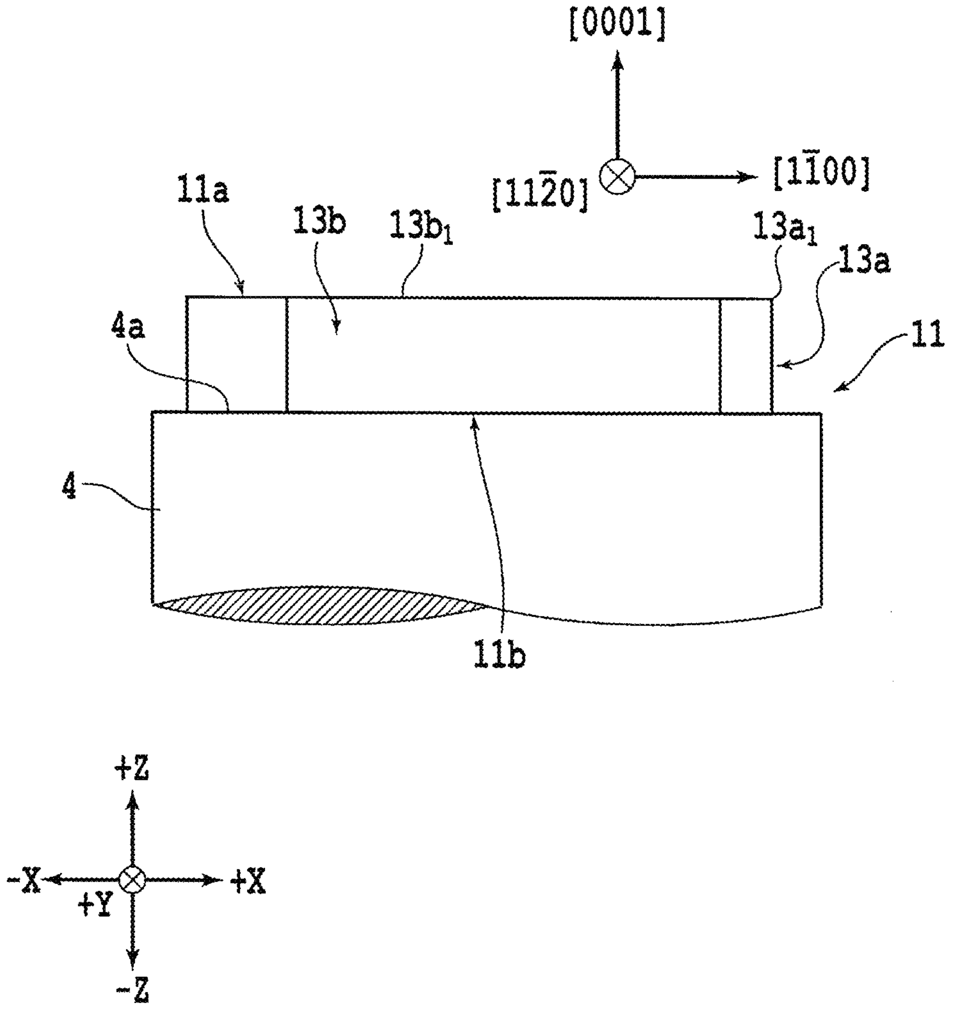
FIG. 5 is a side view depicting a holding step.

Next, the manufacturing method of the wafer 15 according to the first embodiment is described according to the procedure depicted in FIG. 1. FIG. 5 is a side view depicting the holding step S10 of sucking and holding the second surface 11*b* of the ingot 11 by the holding surface 4*a*. In the holding step S10, the ingot 11 is sucked and held by the holding surface 4*a* such that the second surface 11*b* is in contact with the holding surface 4*a* and the first surface 11*a* is exposed upward.

Moreover, in the holding step S10, after the suction holding, misalignment of the second OF 13*b*1 with respect to the X-axis direction of the laser processing apparatus 2 is identified by imaging the side of the first surface 11*a* by the imaging unit. Thereafter, the second OF 13*b*1 is made substantially parallel to the X-axis direction by rotating the chuck table 4 by the rotational drive mechanism to cancel out this misalignment.

After the holding step S10, the first surface 11*a* is irradiated with the laser beam $L_C$ in the burst mode from the upper side of the first surface 11*a* (namely, opposite side to the second surface 11*b*), and a separation layer 11*d* (see FIGS. 3 and 8A) is formed at a predetermined depth position from the first surface 11*a*.

Figure 6:
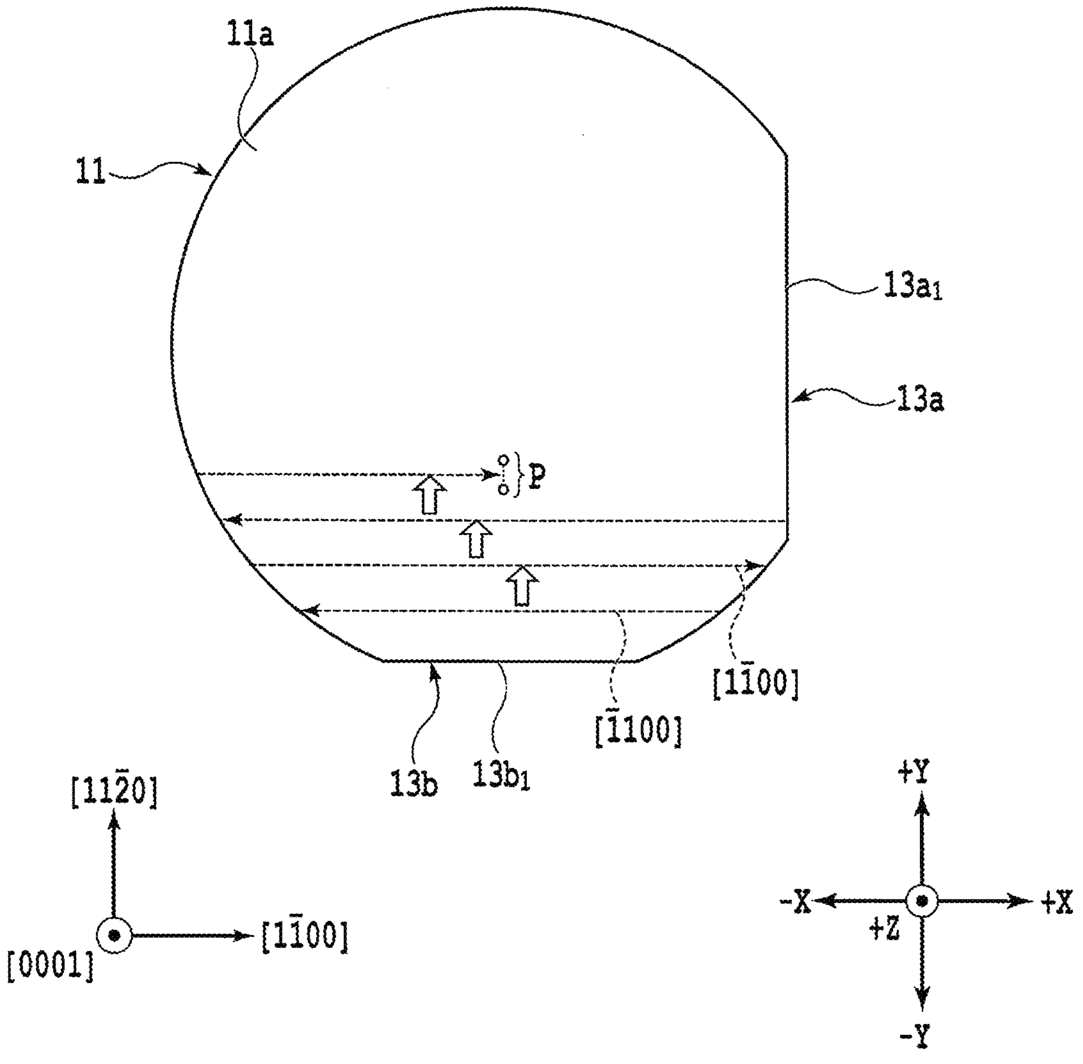
FIG. 6 is a plan view depicting a separation layer forming step.

FIG. 6 is a plan view depicting the separation layer forming step S20. In FIG. 6, for facilitation of understanding, two of the plurality of focal points P are depicted by comparatively large circles and several focal points located between these two focal points P are omitted.

In the separation layer forming step S20, while the respective focal points P are disposed to line up along the Y-axis direction at a predetermined depth position 11*e* (see FIGS. 3 and 8A) in the ingot 11, the plurality of focal points P and the ingot 11 (namely, chuck table 4) are relatively moved along the X-axis direction (predetermined direction).

In the separation layer forming step S20 of the present embodiment, the plurality of focal points P are relatively moved in the −X direction and then indexing feed is executed. Thereafter, the plurality of focal points P are relatively moved in the +X direction. Then, the plurality of focal points P are relatively moved in the −X direction again. In this manner, the movement in the −X direction and the movement in the +X direction are alternately repeated.

In FIG. 6, the movement path of the plurality of focal points P in the ingot 11 is depicted by dashed arrows. The plurality of focal points P may be moved only in the −X direction or be moved only in the +X direction instead of being alternately moved in the −X direction and the +X direction.

When the relative movement direction of the plurality of focal points P and the ingot 11 is along the X-axis direction, this movement direction is parallel to crystal orientations indicated in the following (8).

[Math. 8]

$$[\bar{1}100],\ [1\bar{1}00] \tag{8}$$

The two crystal orientations indicated in (8) are two out of six equivalent crystal orientations in the ingot 11 having the hexagonal crystal structure as indicated in the following (9).

[Math. 9]

$$\langle 10\bar{1}0\rangle = [10\bar{1}0],\ [\bar{1}010],\ [\bar{1}100],\ [1\bar{1}00],\ [01\bar{1}0],\ [0\bar{1}10] \tag{9}$$

Incidentally, the relative movement direction of the plurality of focal points P and the ingot 11 does not have to be completely parallel to the crystal orientation identified by (8), and the angle formed between the crystal orientation identified by (8) and this relative movement direction in the c-plane (see the above-described (2)) may be equal to or smaller than 10°. The inventor has confirmed, by an experiment, that the separation layer 11*d* is formed even in this case. One example of processing conditions used in the separation layer forming step S20 is indicated below.

- Wavelength: 1064 nm
- Processing feed rate: 1000 mm/s
- The amount of indexing feed: 106 μm (namely, index amount)
- Repetition frequency: 50 kHz
- The number of bursts: 10 (the number of pulses included in the pulse group 12*a*)
- The number of branches: 10 (the number of branches of the laser beam $L_C$)
- The number of paths: 1
- Spot diameter of each focal point: approximately 5 μm
- Depth position of focal points: approximately 170 μm from the first surface 11*a* toward the inside of the ingot 11

Under these processing conditions, the interval between adjacent focal points in the 10 focal points is set to 12.5 μm, for example. Further, when the 10 focal points P are disposed, a range of 12.5 μm×9 is irradiated with the laser beam $L_C$. Thus, the length of the irradiation region of the plurality of focal points P disposed along the Y-axis direction is 112.5 μm (see FIG. 7).

Figure 7:
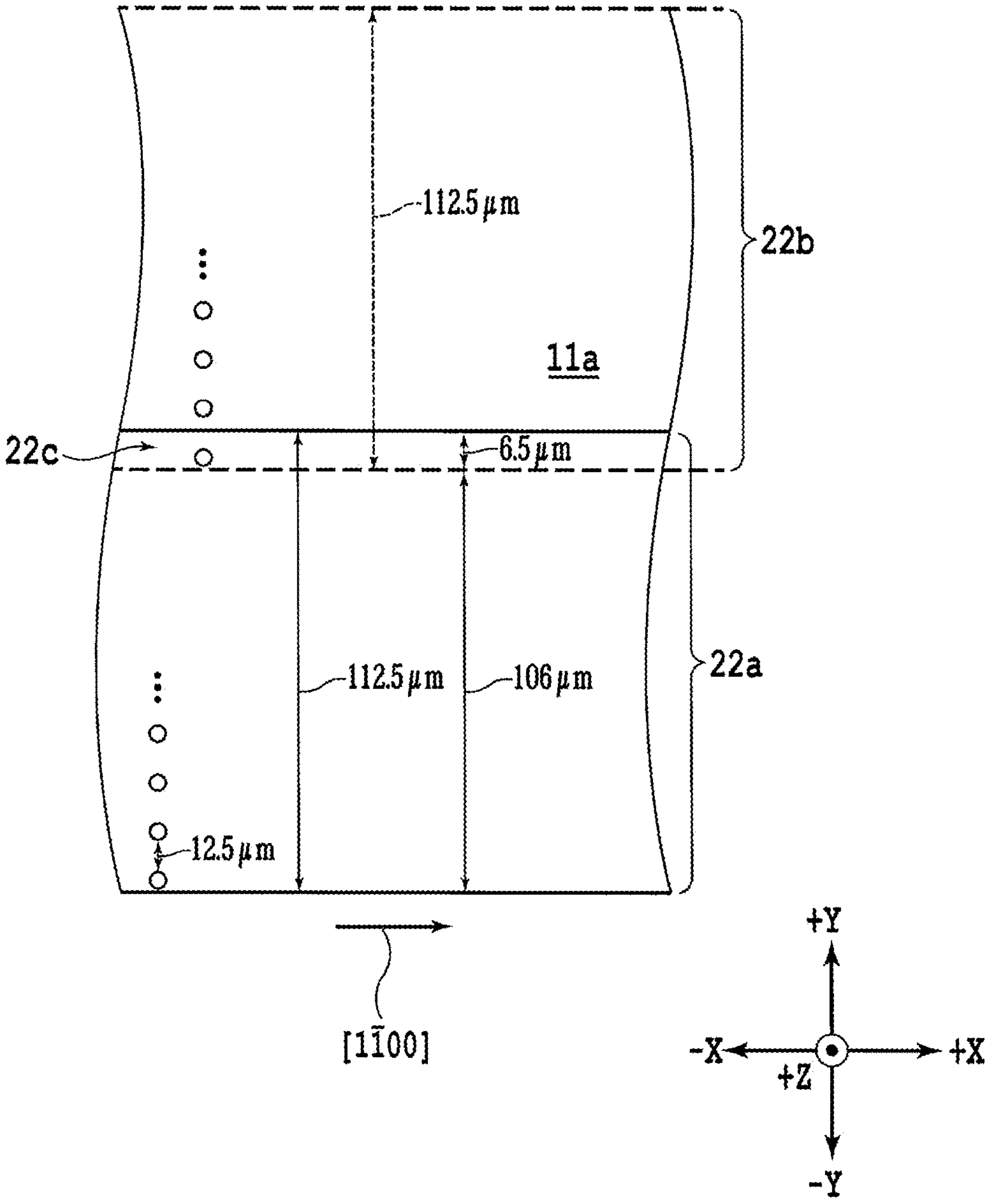
FIG. 7 is a plan view depicting overlapping between movement regions of a plurality of focal points.

When the plurality of focal points P are relatively moved along the X-axis direction, the locus of the movement of the plurality of focal points P is included in a first movement region 22*a* depicted by solid lines in FIG. 7. After the plurality of focal points P are moved along the X-axis direction, indexing feed is executed by the above-described predetermined index amount by relatively moving the irradiation head 20 and the chuck table 4 along the Y-axis direction.

In this state, the plurality of focal points P are similarly relatively moved along the X-axis direction. The locus of the movement of the plurality of focal points P after the indexing feed is included in a second movement region 22*b* depicted by dashed lines in FIG. 7. As depicted in FIG. 7, the first movement region 22*a* and the second movement region 22*b* partly overlap in an overlapping region 22*c* as viewed from the first surface 11*a*.

FIG. 7 is a plan view depicting the overlapping between the first movement region 22*a* and the second movement region 22*b*. The width of the overlapping in the Y-axis direction is 6.5 μm under the above-described processing conditions. Such an overlapping region 22*c* is formed on both sides of each movement region in the Y-axis direction except two movement regions located at end portions of the first surface 11*a* in the Y-axis direction.

Incidentally, the crystallinity of the ingot 11 changes due to multi-photon absorption in the vicinity of each of the plurality of focal points P. For example, in a region in which the multi-photon absorption has occurred, a modified region in which the mechanical strength has lowered, compared with a region in which the multi-photon absorption has not occurred is formed.

In addition, cracks extend along the XY plane direction from the modified region. Depending on the processing conditions, the cracks extend along the Z-axis direction from the modified region in some cases. In the present embodiment, a region in which the modified region and the cracks are formed inside the ingot 11 is referred to as the separation layer 11*d*.

Figure 8A:
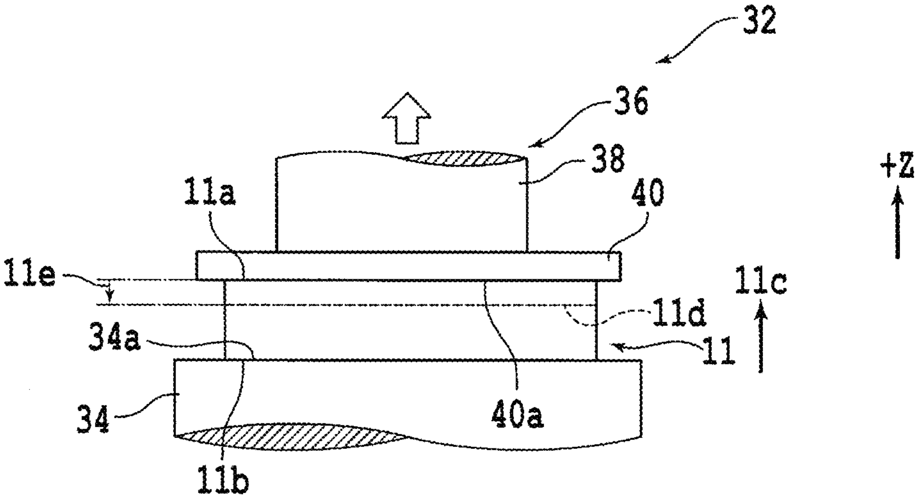
FIG. 8A is a diagram depicting a separation step.
Figure 8B:
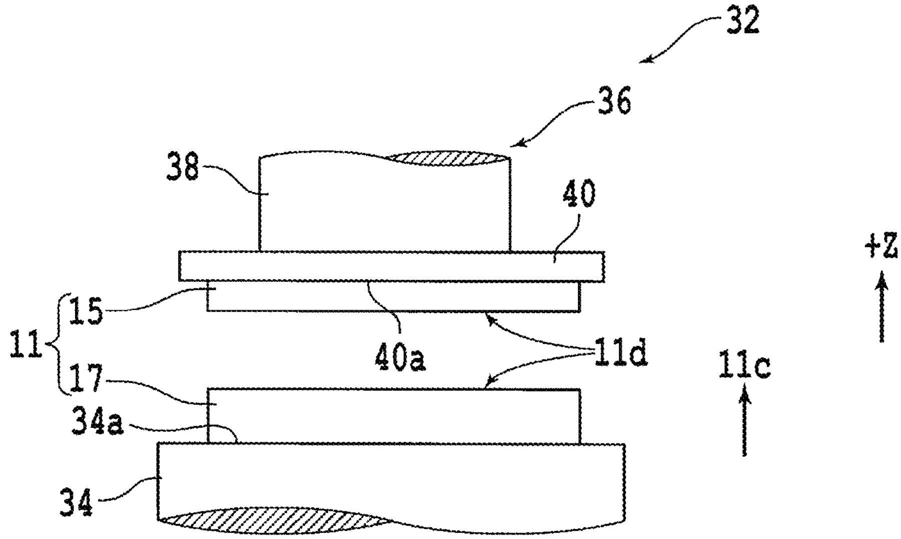

After the separation layer forming step S20, the ingot 11 is separated into the wafer 15 and another ingot 17 by using a separation apparatus 32 as depicted in FIGS. 8A and 8B (separation step S30). The separation apparatus 32 is described with reference to FIG. 8A.

The separation apparatus 32 has a chuck table 34 with substantially the same diameter as the above-described chuck table 4. The structure of the chuck table 34 is substantially the same as the chuck table 4, and the upper surface of the chuck table 34 functions as a holding surface 34*a* that sucks and holds the ingot 11. A separation unit 36 is disposed over the chuck table 34.

The separation unit 36 has a circular columnar movable portion 38 having a longitudinal portion disposed along the Z-axis direction. A Z-axis direction movement mechanism (not depicted) is coupled to the movable portion 38, and the movable portion 38 can move along the Z-axis direction. The Z-axis direction movement mechanism is, for example, a movement mechanism of a ball screw system, but may be configured by another actuator.

A suction head 40 with a circular disc shape is disposed on a bottom portion of the movable portion 38. The suction head 40 has a frame body and a porous plate similarly to the chuck table 34. The lower surfaces of the frame body and the porous plate are disposed to be substantially flush with each other and be substantially parallel to the XY plane, and function as a holding surface 40*a*.

FIG. 8A is a diagram depicting the separation step S30. In the separation step S30, the second surface 11*b* of the ingot 11 in which the separation layer 11*d* is formed is sucked and held by the holding surface 34*a* of the chuck table 34. In addition, the first surface 11*a* is sucked and held by the holding surface 40*a* of the suction head 40.

Subsequently, an external force is given to the ingot 11. The external force is given by, for example, driving a wedge (not depicted) into the side surface of the ingot 11 at the height position of the separation layer 11*d*. It is preferable that the wedge be driven into not only one place on the side surface of the ingot 11 but also a plurality of places along the circumferential direction of the ingot 11.

By giving the external force, the cracks are further extended in the XY plane direction at the depth position 11*e* at which the separation layer 11*d* is formed. The external force may be given by applying ultrasonic waves (namely, elastic vibration waves in a frequency band that exceeds 20 kHz) to the ingot 11 instead of driving the wedge.

In the case of applying ultrasonic waves, the ultrasonic waves are applied to the side of the first surface 11*a* through a liquid such as purified water before the first surface 11*a* is sucked and held by the holding surface 40*a* of the suction head 40. Specifically, the liquid to which the ultrasonic waves are applied is jetted from a nozzle onto the ingot 11, or the ultrasonic waves are applied to the side of the first surface 11*a* from a horn through the liquid.

The inventor has confirmed, by an experiment, that undesirable breakage occurs if an external force is applied to the whole of the side of the first surface 11*a* at one time. Thus, in the case of using the nozzle or the horn, first, an external force is applied to a local region with a diameter of approximately 5 mm to 50 mm on the side of the first surface 11*a* by using ultrasonic waves.

Subsequently, the external force is applied to another region on the side of the first surface 11*a* by relatively moving the nozzle or the horn and the chuck table 34. By gradually expanding the region to which the external force has been applied on the side of the first surface 11*a* in this manner, the cracks between the modified regions can be extended along the first surface 11*a*.

Due to the giving of the external force, the cracks connect to each other between adjacent modified regions, and the mechanical strength of the separation layer 11*d* becomes weaker than the region other than the separation layer 11*d* in the ingot 11. Consequently, the wafer 15 can be separated from the ingot 11 by a small force compared, with the case in which the external force is not given.

After the external force is given, the suction head 40 is raised (namely, moved in the +Z direction). As a result, the wafer 15 is separated from the ingot 11 by the separation layer 11*d*. That is, the wafer 15 is separated from the ingot 11, with the separation layer 11*d* being the point of origin. FIG. 8B is a diagram depicting the wafer 15 separated from the ingot 11, and the like. The above-described giving of the external force may be executed concurrently with the rise in the suction head 40.

The separation layer 11*d* has a thickness of approximately 50 μm to 60 μm (for example, 58 μm) in the thickness direction 11*c*, and this thickness of the separation layer 11*d* corresponds to the above-described kerf loss. By executing the laser processing of the ingot 11, the kerf loss in the thickness direction 11*c* of the ingot 11 can be reduced, compared with the case of using a slicer. Therefore, the productivity of the wafer 15 in manufacturing of the wafer 15 from the ingot 11 is improved. Even when a wire saw is used, the kerf loss needs to be at least approximately 150 μm. Accordingly, the manufacturing method of the present embodiment is superior, even compared with the case of using the wire saw.

In the above-described example, it has been explained that the plurality of focal points P are disposed at the predetermined depth position 11*e* in the ingot 11 and the separation layer 11*d* is formed. However, it is also possible to form the separation layer 11*d* at a predetermined depth position in a single-crystal substrate (workpiece) of GaN instead of the ingot 11 and separate the wafer 15 from this single-crystal substrate. In this case, it is sufficient to use the single-crystal substrate of GaN thicker than the thickness of the wafer 15 (namely, length in the c-axis direction) after the separation. That is, the thickness of the wafer 15 is a thickness smaller than the distance between both surfaces in the c-axis direction (first surface and second surface) in the single-crystal substrate of GaN.

(Modification)

Figure 9:
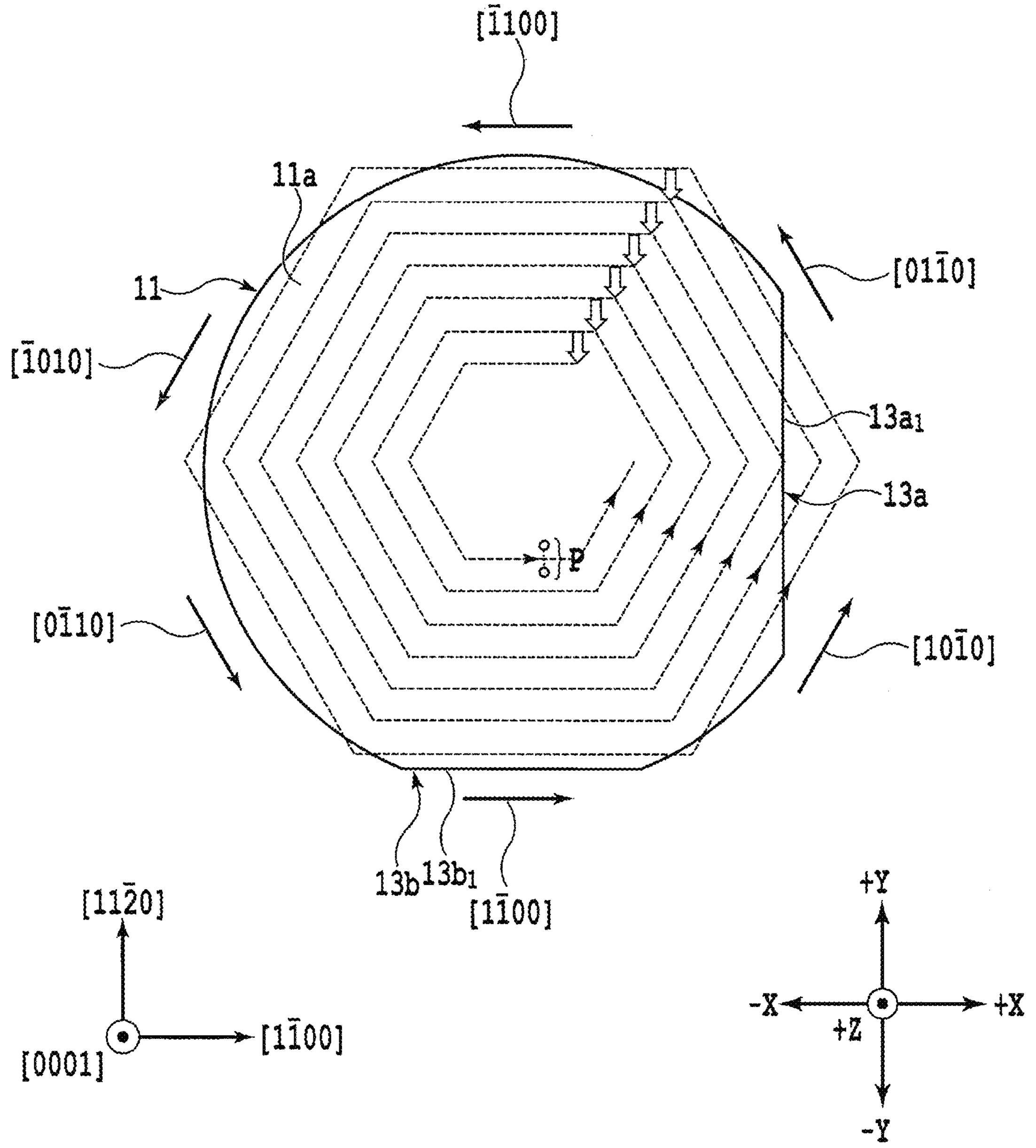
FIG. 9 is a diagram depicting a modification of the separation layer forming step.

Next, a modification of the separation layer forming step S20 is described. FIG. 9 is a diagram depicting the modification of the separation layer forming step S20. In the separation layer forming step S20 according to the modification, the relative movement of the plurality of focal points P and the ingot 11 at the above-described processing feed rate is executed not in a straight line manner along the X-axis direction but in a regular hexagonal manner. The modification is different from the first embodiment in this point, but is the same as the first embodiment in the other points.

For example, the plurality of focal points P are relatively moved along the respective crystal orientations in order of the following (10), (11), (12), (13), (14), and (15). Such processing can be implemented by, for example, combining the linear movement of the chuck table 4 by the horizontal direction movement mechanism and the rotation of the chuck table 4 by the rotational drive mechanism as appropriate.

[Math. 10]

$$[\bar{1}100] \tag{10}$$

[Math. 11]

$$[\bar{1}010] \tag{11}$$

[Math. 12]

$$[0\bar{1}10] \tag{12}$$

[Math. 13]

$$[1\bar{1}00] \tag{13}$$

[Math. 14]

$$[10\bar{1}0] \tag{14}$$

[Math. 15]

$$[01\bar{1}0] \tag{15}$$

After the plurality of focal points P are relatively moved to draw one regular hexagon, the plurality of focal points P are moved toward the center of the ingot 11 in the radial direction by the above-described predetermined index amount. Thereafter, similarly, the plurality of focal points P are relatively moved in order of (10) to (15). Due to this, the movement region of the plurality of focal points P is a plurality of regular hexagons concentrically disposed as depicted in FIG. 9. It is to be noted that, as indicated in (9), all of (10) to (15) are included in the crystal orientation indicated by (1).

In this modification, at the start of the laser processing, the plurality of focal points P are moved in the direction indicated in (10). However, the laser processing may be started from any crystal orientation of (10) to (15) as long as the plurality of focal points P can be relatively moved in a regular hexagonal manner.

Moreover, the relative movement direction of the plurality of focal points P and the ingot 11 does not have to be completely parallel to the crystal orientation identified by (1), and the angle formed between the crystal orientation identified by (1) and this relative movement direction in the c-plane may be equal to or smaller than 10°.

For example, in the case of relatively moving the plurality of focal points P and the ingot 11 along the crystal orientation identified by (10), it is also possible that the angle formed between the crystal orientation identified by (10) and this relative movement direction in the c-plane is set equal to or smaller than 10°.

This is the same also in the case of relatively moving the plurality of focal points P and the ingot 11 along the crystal orientations identified by (11) to (15). This modification can be similarly applied also to a single-crystal substrate of GaN instead of the ingot 11.

Second Embodiment

Figure 10:
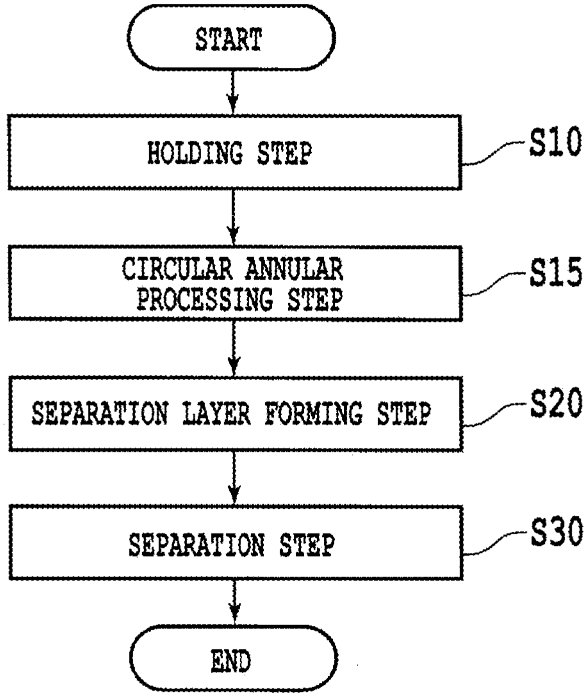
FIG. 10 is a flowchart of a manufacturing method according to a second embodiment.
Figure 11:
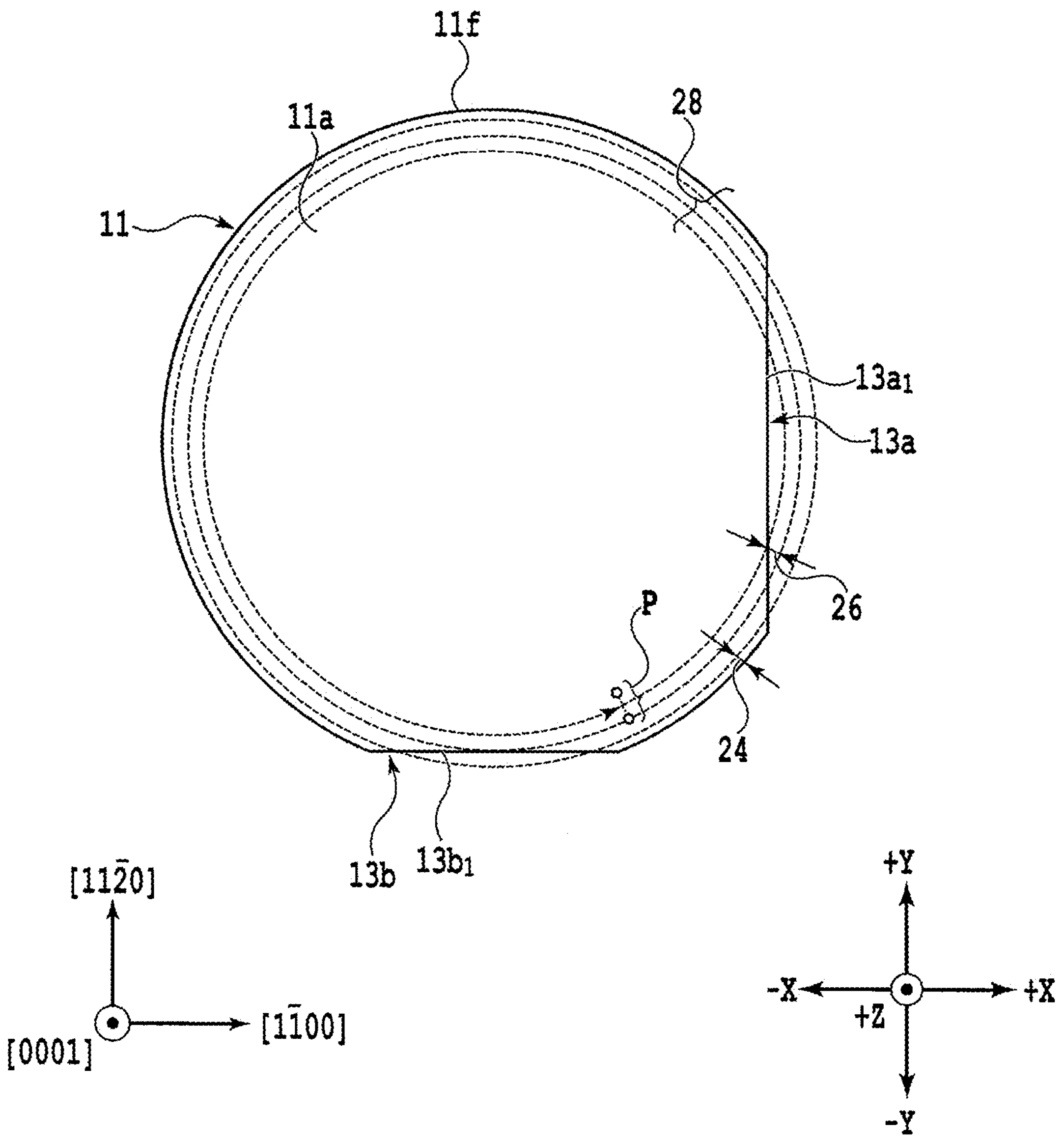
FIG. 11 is a plan view depicting a circular annular processing step.

Next, a second embodiment is described with reference to FIGS. 10 and 11. FIG. 10 is a flowchart of a manufacturing method of the wafer 15 according to the second embodiment. FIG. 11 is a plan view depicting a circular annular processing step S15.

The manufacturing method according to the second embodiment further includes the circular annular processing step S15 of executing irradiation with the laser beam $L_C$ in a circular annular manner along an outer circumferential edge 11*f* of the ingot 11 after the holding step S10 and before the separation layer forming step S20.

In the present embodiment, the irradiation with the laser beam $L_C$ in a circular annular manner along the outer circumferential edge 11*f* means that irradiation with the laser beam $L_C$ is executed along the circular edge of the first surface 11*a* while it is deemed that the edge of the first surface 11*a* partly lost due to the existence of the first OF 13*a*1 and the second OF 13*b*1 is complemented to become the circular shape.

Also in the circular annular processing step S15, the plurality of focal points P are positioned at the same predetermined depth position 11*e* as that when the separation layer 11*d* is formed in the separation layer forming step S20. In the circular annular processing step S15, first, the plurality of focal points P are disposed to line up along the Y-axis direction at the predetermined depth position 11*e* in the ingot 11.

At this time, one focal point located on the outermost side is located at, for example, a position separate from the outer circumferential edge 11*f* inward in the radial direction of the ingot 11 by a predetermined distance 24. The predetermined distance 24 is, for example, at least 4 μm and at most 8 μm, and is at least 5 μm and at most 6 μm in preferred one example.

In this state, the chuck table 4 is caused to make one rotation at a predetermined rotation speed in an arrow direction depicted in FIG. 11. After the one rotation, the plurality of focal points P are moved inward in the radial direction of the ingot 11. Specifically, indexing feed of the chuck table 4 is executed along the Y-axis direction by a predetermined index amount 26. For example, the predetermined index amount 26 is 106 μm.

The predetermined rotation speed of the chuck table 4 is adjusted as appropriate, for example, such that the circumferential speed at the plurality of focal points P becomes substantially equal to the above-described processing feed rate. The predetermined rotation speed of the chuck table 4 may be adjusted to implement a preferred aspect ratio (b/a) to be described later.

In this manner, the separation layer 11*d* is formed also in an outer circumferential region 28 of the ingot 11 in the circular annular processing step S15. FIG. 11 depicts the example in which the chuck table 4 is caused to make three rotations and three annular separation layers 11*d* are concentrically formed. However, the number of rotations is not limited to three.

The other processing conditions (wavelength, repetition frequency, the number of bursts, the number of branches, the number of paths, spot diameter of each focal point, and depth position of focal points) are set to, for example, the same as those of the first embodiment. This can smoothly execute the separation layer forming step S20 after the circular annular processing step S15.

When the separation layer 11*d* is formed in the separation layer forming step S20, bonding between the Ga atom and the N atom is split and $N_2$ (nitrogen molecule) is made, so that a nitrogen gas is generated. If the separation layer 11*d* has not been formed in the outer circumferential region 28 through the circular annular processing step S15, there is a possibility that an abnormal volume expansion region is formed inside in the radial direction of the ingot 11 due to the nitrogen gas formed in the separation layer forming step S20.

In the second embodiment, the separation layer 11*d* formed in the outer circumferential region 28 functions as a path that causes the nitrogen gas generated inside in the radial direction of the ingot 11 in the separation layer forming step S20 to get out of the ingot 11. Therefore, the abnormal volume expansion on the inside in the radial direction of the ingot 11 can be suppressed. In addition, forming the separation layer 11*d* in the outer circumferential region 28 can suppress extension of cracks in undesirable directions (for example, c-axis direction) and promote outward extension of cracks in the c-plane of the ingot 11.

(Experiment Indicating Relation between Crystal Orientation and Formation of Cracks)

Figure 12:
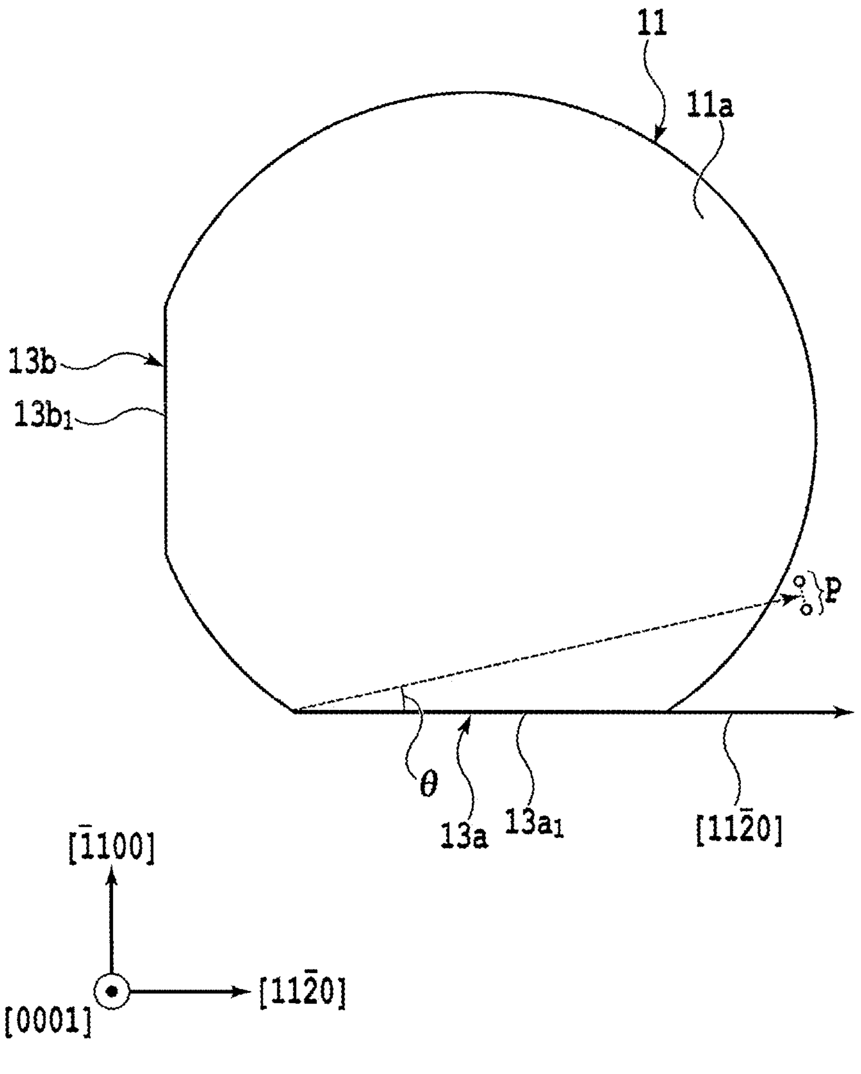
FIG. 12 is a plan view of the ingot indicating an angle θ formed between a predetermined direction and the movement direction of the plurality of focal points in an experiment to evaluate the crystal orientation dependence of the minimum output power with which cracks are formed.
Figure 13A:
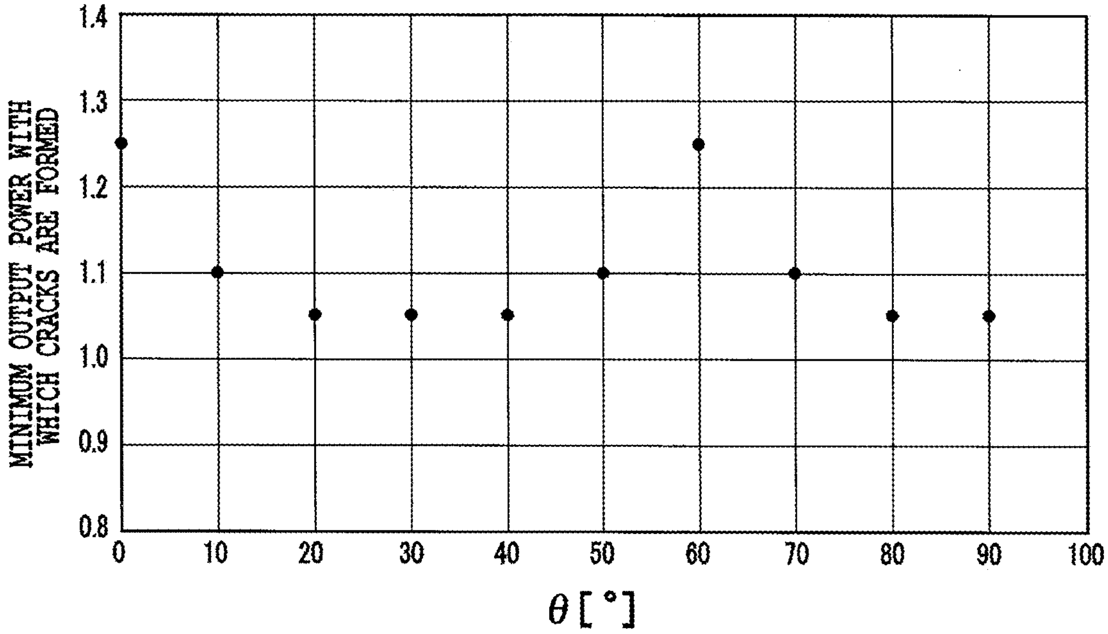
FIG. 13A is a graph indicating the minimum output power with which cracks are formed with respect to the angle θ.
Figure 13B:
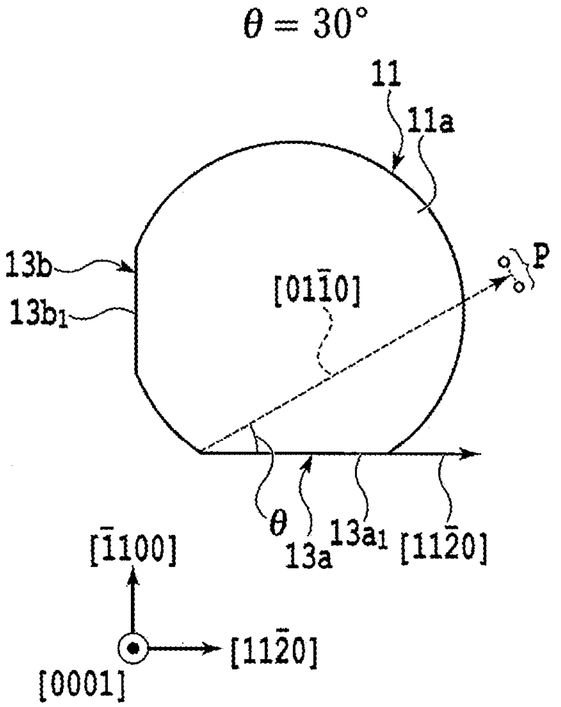
FIG. 13B is a plan view of the ingot in the case of θ=30°.
Figure 13C:
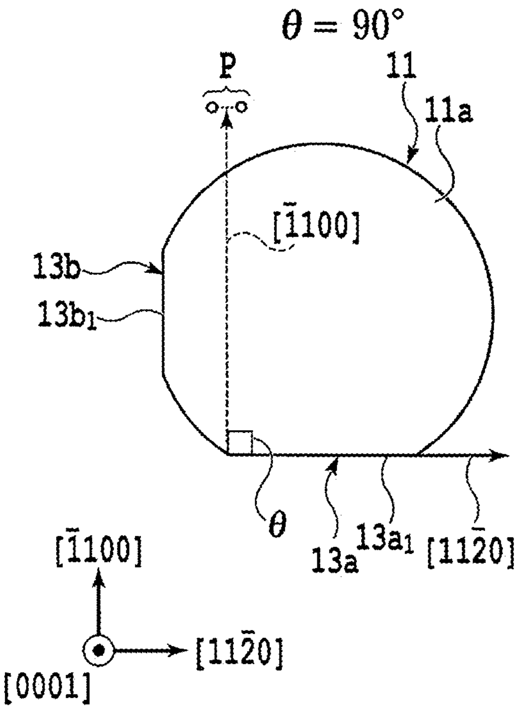
FIG. 13C is a plan view of the ingot in the case of θ=90°.

Next, with reference to FIGS. 12 to 13C, a description is given of the result of an experiment to investigate the relation between the minimum output power of the laser beam $L_C$ with which cracks that couple adjacent modified regions to each other can be formed and the movement direction of the plurality of focal points P that linearly move on the c-plane.

FIG. 12 is a plan view of the ingot 11 indicating an angle θ formed between a predetermined direction (first OF 13*a*$_1$) and the movement direction of the plurality of focal points P (namely, scanning direction of the laser beam $L_C$) on the c-plane in the experiment to evaluate the crystal orientation dependence of the minimum output power with which cracks are formed. Also in this experiment, the direction in which the plurality of focal points P obtained by splitting line up is orthogonal to the direction in which the plurality of focal points P move on the c-plane.

For example, θ=0° is satisfied when the movement direction of the plurality of focal points P is the crystal orientation indicated by the above-described (6), and θ=90° is satisfied when the movement direction of the plurality of focal points P is the crystal orientation indicated by the above-described (7). Processing conditions in this experiment were set as follows.

Wavelength: 1064 nm
Processing feed rate: 1000 mm/s
Repetition frequency: 50 kHz
The number of bursts: 10 (the number of pulses included in the pulse group 12*a*)
The number of branches: 10 (the number of branches of the laser beam $L_C$)
The number of paths: 1
Spot diameter of each focal point: approximately 5 μm
Interval between adjacent focal points: 12.5 μm
Depth position of focal points: approximately 170 μm from the first surface 11*a* toward the inside of the ingot 11

In this experiment in which the number of branches is 10, the output power of the laser beam $L_C$ means the sum of the respective values of the output power of laser beams $L_{C1}$ to $L_{C10}$ incident on the ingot 11 after being transmitted through the collecting lens in the irradiation head 20.

In this experiment, first, while the value of θ was fixed at 0° and the output power of the laser beam $L_C$ was fixed at a predetermined value, the first surface 11*a* (namely, c-plane) was scanned with the laser beam $L_C$. Next, the output power of the laser beam $L_C$ was increased by 0.05 W while the value of θ was fixed at 0°. As the result of increasing the output power of the laser beam $L_C$ in a stepwise manner in this manner, the minimum output power of the laser beam $L_C$ with which cracks that coupled adjacent modified regions to each other could be formed was 1.25 W (θ=0°).

Next, after θ was increased by 10°, the output power of the laser beam $L_C$ was similarly raised in a stepwise manner. As a result, the minimum output power of the laser beam $L_C$ was 1.10 W (θ=10°). Similarly, θ was increased in units of 10°. In addition, at each angle, the minimum output power of each laser beam $L_C$ with which cracks that coupled adjacent modified regions to each other could be formed was sought.

As a result, the respective values of the minimum output power of the laser beam $L_C$ were 1.05 W (θ=20°), 1.05 W (θ=30°), 1.05 W (θ=40°), 1.10 W (θ=50°), 1.25 W (θ=60°), 1.10 W (θ=70°), 1.05 W (θ=80°), and 1.05 W (θ=90°).

FIG. 13A is a graph indicating the minimum output power with which cracks are formed with respect to the angle θ. FIG. 13B is a plan view of the ingot 11 in the case of θ=30°. FIG. 13C is a plan view of the ingot 11 in the case of θ=90°. As depicted in FIG. 13A, the output power of the laser beam $L_C$ becomes the minimum when θ falls within a range of 20° to 40° (namely, 30°−10°≤θ≤30°+10°). That is, it is preferable that the scanning direction of the laser beam $L_C$ fall within a range of the crystal orientation indicated by the above-described (15)±10° in the c-plane.

Here, regarding θ, only the experimental result up to 90° exists. However, in view of the fact that the ingot 11 has the hexagonal crystal structure and has rotational symmetry of 60° in the c-plane, it is rationally presumed that a similar result is obtained also when θ falls within a range of 80° to 100° (namely, 90°−10°≤θ≤90°+10°). That is, it can be said that it is also similarly preferable that the scanning direction of the laser beam $L_C$ fall within a range of the crystal orientation indicated by the above-described (10)±10° in the c-plane.

Further, in view of the rotational symmetry of 60°, it can be said that the scanning direction of the laser beam $L_C$ is similarly preferable when falling within a range of one of the six equivalent crystal orientations indicated by the above-described (9)±10° in the c-plane. That is, it can be rationally presumed that cracks that couple adjacent modified regions to each other can be formed without setting the output power of the laser beam $L_C$ excessively high by causing the scanning direction of the laser beam $L_C$ to fall within the range of one of the six equivalent crystal orientations indicated by the above-described (9)±10° in the c-plane.

(Experiment Relating to Arrangement of Modified Regions and Formation Condition of Separation Layer 11*d*)

Next, with use of FIGS. 14 to 17, a description is given of an experimental result in the case in which, in the separation layer forming step S20, the interval between focal points adjacent in the scanning direction of the laser beam $L_C$ (distance b indicated in FIG. 15) with respect to the interval between adjacent focal points among the plurality of focal points P obtained by splitting (distance a indicated in FIG. 15) was varied.

In this experiment, single-crystal substrates of GaN were processed by using the above-described laser processing apparatus 2. The wavelength, the repetition frequency, the number of bursts, the number of branches, the number of paths, the spot diameter of each focal point, the depth position of the focal points, and the interval between the focal points were set to the same as those of the first embodiment. However, the processing feed rate (mm/s) and the output power of the laser beam $L_C$ were varied as appropriate depending on the aspect ratio (b/a). Also in this experiment, the direction in which the plurality of focal points P obtained by splitting line up is orthogonal to the direction in which the plurality of focal points P move on the c-plane.

Figure 14:
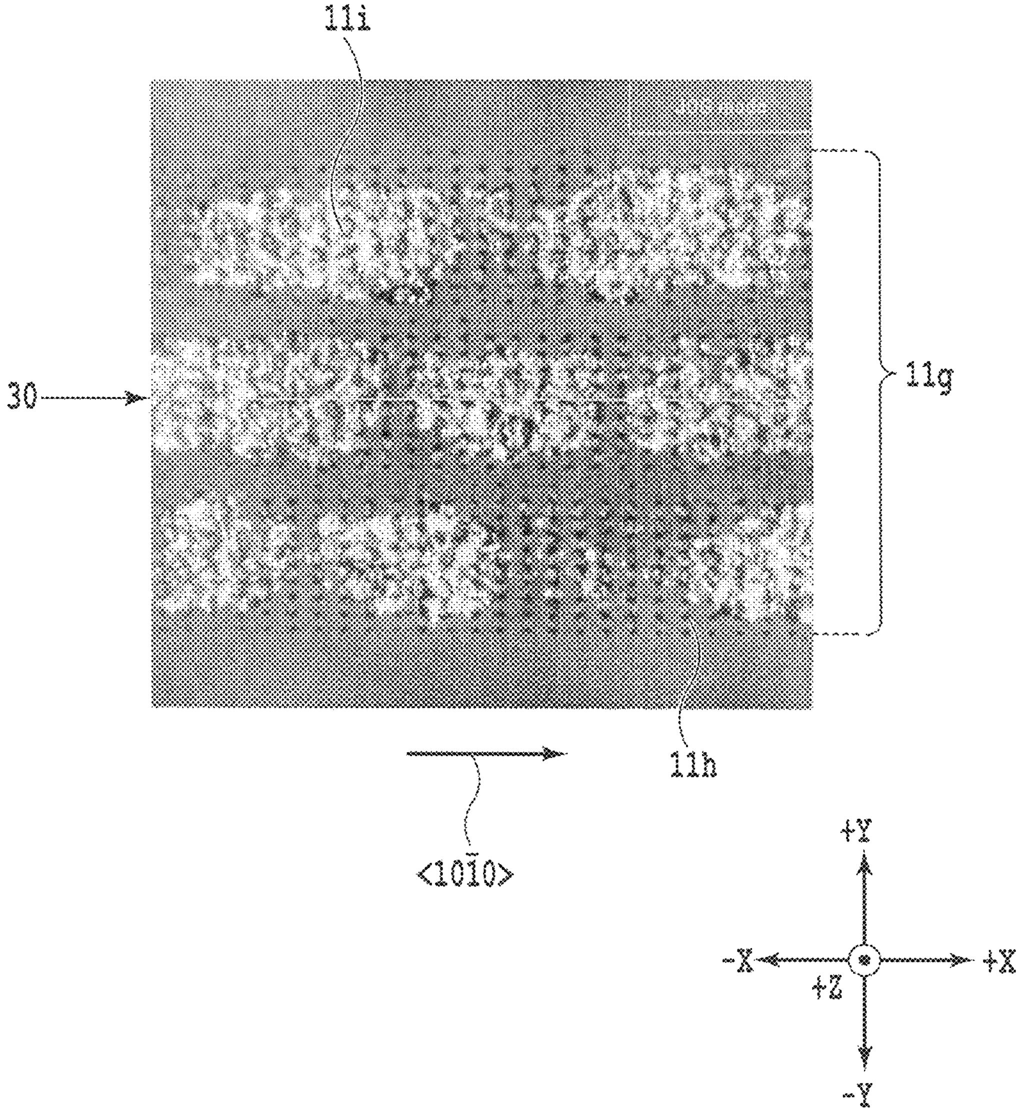
FIG. 14 is a photograph of a single-crystal substrate in which sufficient cracks are not formed among entire modified regions.
Figure 16:
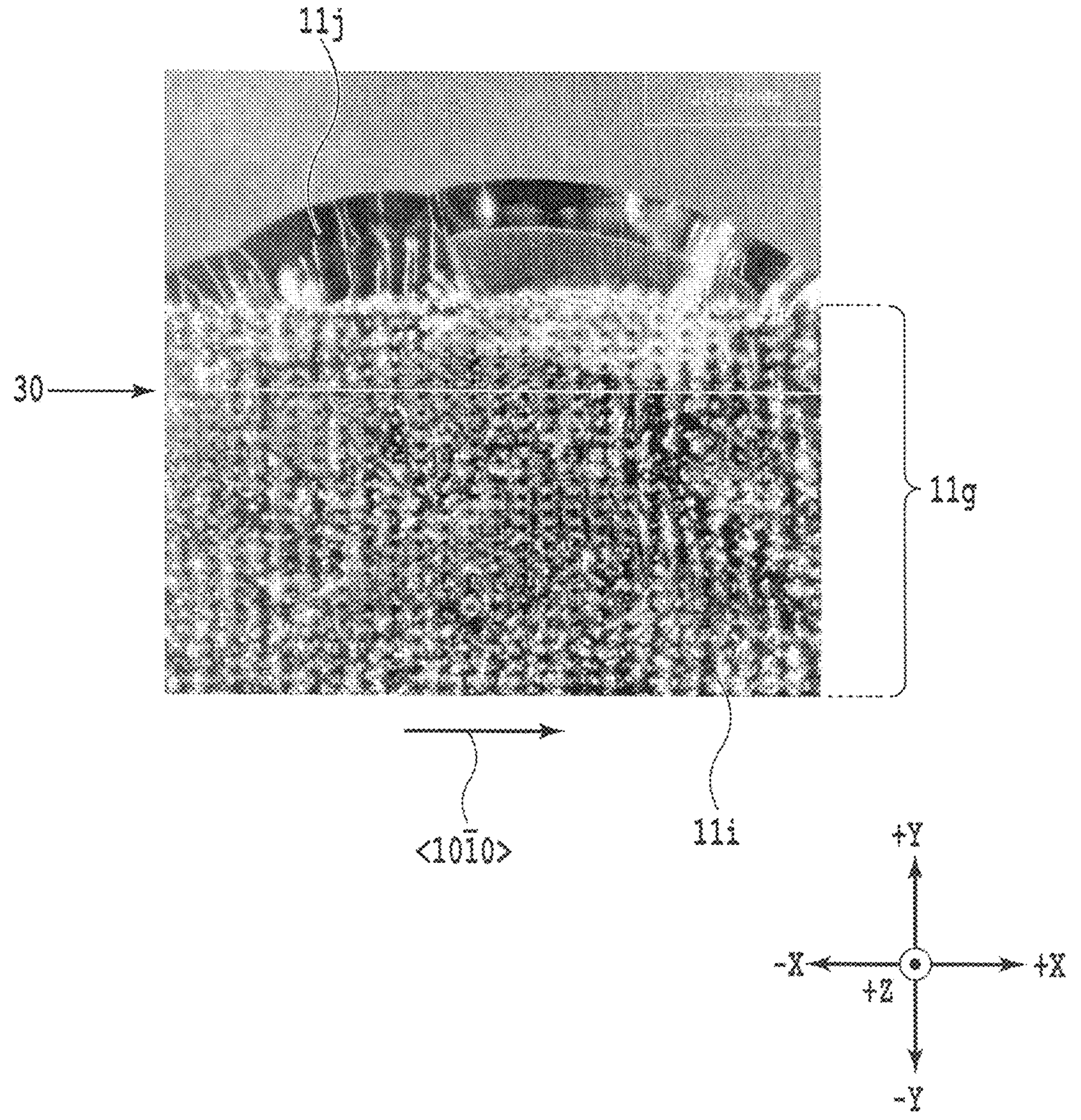
FIG. 16 is a photograph of a single-crystal substrate in which comparatively large cracks are formed in the c-axis direction.
Figure 17:
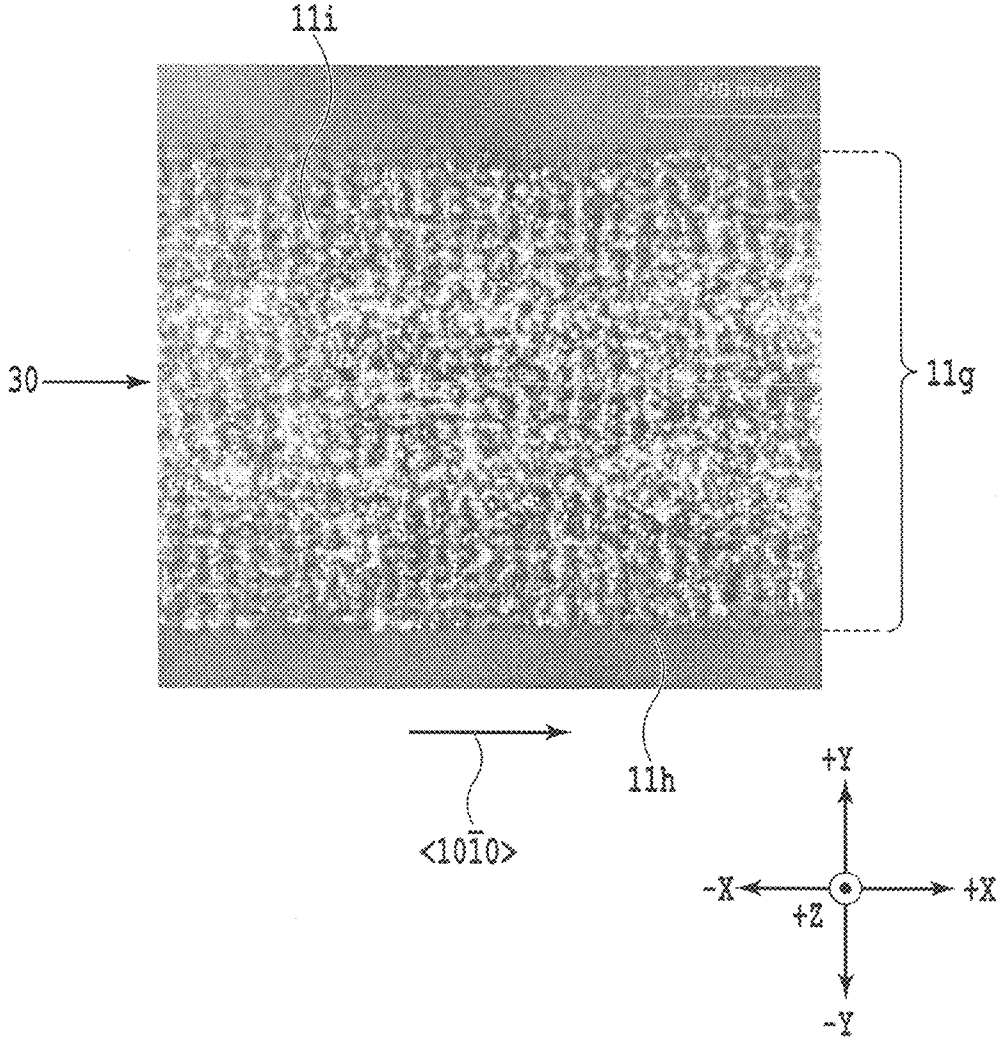
FIG. 17 is a photograph of a single-crystal substrate in which the cracks are sufficiently formed among the entire modified regions.

Moreover, at the time of processing of the single-crystal substrate depicted in each of FIGS. 14, 16, and 17, the amount of indexing feed was set to 112.5 μm and laser processing was executed for three parallel linear regions. In FIGS. 14, 16, and 17, the three parallel linear regions are collectively indicated by numeral 11*g*. However, the laser processing was executed such that the overlapping region 22*c* (see FIG. 7) was not formed.

FIG. 14 is a photograph of the single-crystal substrate in which sufficient cracks 11*i* (white regions in FIG. 14) were formed between partial modified regions 11*h* (black circle regions in FIG. 14) but sufficient cracks 11*i* were not formed in the whole of the space among entire modified regions 11*h*. This photograph was obtained by photographing the side of the first surface 11*a* of the single-crystal substrate after the laser processing by a visible light camera. Photographs of FIGS. 16 and 17 to be described later were also similarly obtained by photographing by the visible light camera.

A straight line that traverses a central part of the image depicted in FIG. 14 in the horizontal direction is a reference line 30 displayed to traverse the center of the field of view of imaging. The strip-shaped linear regions 11*g* are regions in which the laser processing was executed along the crystal orientation indicated by (1). In this image, the modified regions 11*h* are formed in regions displayed by black circles, and the cracks 11*i* are formed in bright regions among the modified regions 11*h*.

Figure 15:
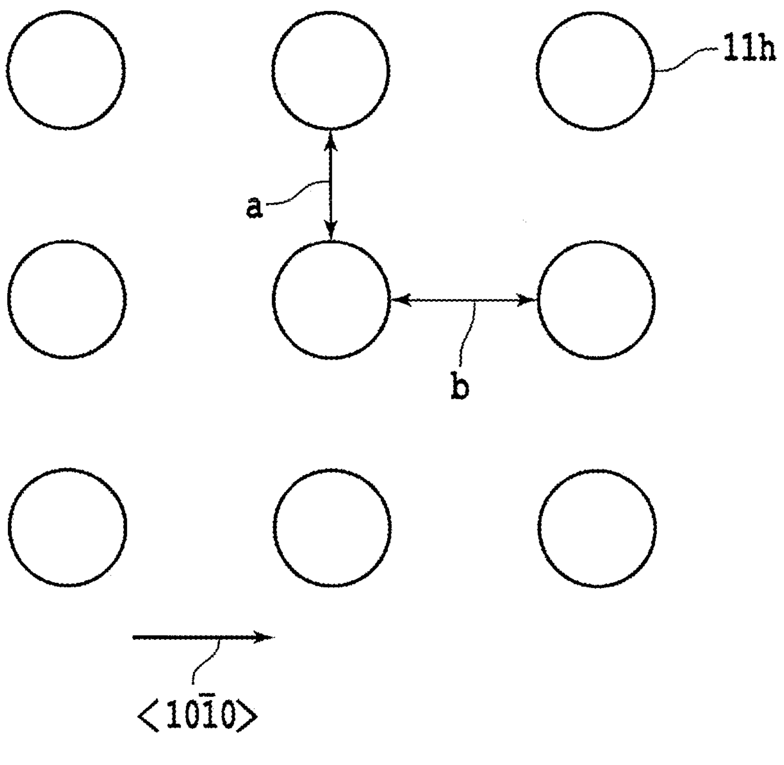
FIG. 15 is a diagram schematically depicting a plurality of modified regions.

FIG. 15 is a diagram schematically depicting a plurality of modified regions 11*h*. The distance a is the interval between the plurality of modified regions 11*h* that line up along the Y-axis direction (namely, corresponds to the interval between the plurality of focal points P that line up along the Y-axis direction), and the unit thereof is μm. Further, the distance b is the interval between the plurality of modified regions 11*h* that line up along the X-axis direction (namely, corresponds to the interval between the plurality of focal points P that line up along the X-axis direction), and the unit thereof is μm. The distance b is set depending on the processing feed rate (namely, relative movement speed between the plurality of focal points P and the ingot 11) and the repetition frequency.

According to the experiment, it has become clear that whether or not the processing is favorable is determined depending on the aspect ratio represented by (b/a). Specifically, when the aspect ratio (b/a) exceeds 3.0, the modified regions 11*h* are separate from each other and thus the cracks 11*i* do not sufficiently extend in the XY plane direction as depicted in FIG. 14. Moreover, when the aspect ratio (b/a) is lower than 0.5, the modified regions 11*h* are close to each other and the cracks 11*i* comparatively sufficiently extend in the XY plane direction as depicted in FIG. 16. However, comparatively large cracks 11*j* are formed in the Z-axis direction.

FIG. 16 is a photograph of the single-crystal substrate in which the comparatively large cracks 11*j* were formed in the c-axis direction. It is to be noted that the cracks 11*j* extended in the Z-axis direction (depth direction) and, in the photograph depicted in FIG. 16, the cracks 11*j* are out of focus and the contours thereof somewhat blur. In contrast, when the aspect ratio (b/a) is at least 0.5 and at most 3.0, the cracks 11*i* can be comparatively sufficiently extended in the XY plane direction and formation of the comparatively large cracks 11*j* in the Z-axis direction can be prevented.

FIG. 17 is a photograph of the single-crystal substrate in which the cracks 11*i* sufficiently extended among the entire modified regions 11*h* and the comparatively large cracks 11*j* were not formed in the Z-axis direction. The aspect ratio (b/a) may be at least 0.8 and at most 2.5 and be at least 1.0 and at most 1.4.

In accordance with the above-described embodiments, the modification, and the experimental results, by forming the separation layer 11*d* in a workpiece by using the laser processing apparatus 2, the kerf loss in the thickness direction of the workpiece can be reduced compared with the case of using a slicer. Besides, structures, methods, and the like according to the above-described embodiments and the like can be carried out with appropriate changes without departing from the range of the object of the present invention.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A manufacturing method of a wafer for manufacturing the wafer having a thickness smaller than a distance between a first surface and a second surface from a workpiece that is an ingot of gallium nitride or a single-crystal substrate of gallium nitride having the first surface and the second surface located on an opposite side to the first surface, the manufacturing method comprising:

a holding step of sucking and holding the second surface of the workpiece;

a separation layer forming step of, after the holding step, forming a separation layer in the workpiece by relatively moving, along a predetermined direction, the workpiece and a focal point of a pulsed laser beam having such a wavelength as to be transmitted through the workpiece in a state in which the first surface is irradiated with the laser beam from an opposite side to the second surface and the focal point is positioned at a predetermined depth position in the workpiece; and a separation step of separating the wafer from the workpiece by using the separation layer as a point of origin after the separation layer forming step, wherein an angle formed between a crystal orientation represented by <$10\bar{1}0$> and the predetermined direction in the separation layer forming step in a (0001) plane is equal to or smaller than 10°.

2. The manufacturing method of a wafer according to claim 1, further comprising:

a circular annular processing step of forming the separation layer in an outer circumferential region of the workpiece by positioning the focal point at the predetermined depth position and executing irradiation with the laser beam in a circular annular manner along an outer circumferential edge of the workpiece after the holding step and before the separation layer forming step.

3. The manufacturing method of a wafer according to claim 1, wherein, in the separation layer forming step, after the workpiece and the focal point are relatively moved in a regular hexagonal manner along the predetermined direction, the focal point is moved toward a center of the workpiece in a radial direction and then the workpiece and the focal point are relatively moved in a regular hexagonal manner along the predetermined direction.

4. The manufacturing method of a wafer according to claim 1, wherein, in the separation layer forming step, a second direction orthogonal to a first direction is employed as the predetermined direction while the laser beam is split into a plurality of laser beams and respective focal points of the plurality of laser beams are disposed to line up along the first direction.

5. The manufacturing method of a wafer according to claim 4, wherein, in the separation layer forming step, after the plurality of focal points are moved along the second direction, the plurality of focal points are moved along the second direction in a state in which the plurality of focal points are shifted along the first direction to partly overlap with a movement region including a locus of the movement of the plurality of focal points in the second direction as viewed from the first surface.

6. The manufacturing method of a wafer according to claim 4, wherein:

an interval of the plurality of focal points that line up along the first direction is equal to or longer than 5 μm and is equal to or shorter than 20 μm in the separation layer forming step.

7. The manufacturing method of a wafer according to claim 6, wherein:

the separation layer formed in the separation layer forming step includes a plurality of modified regions, and an aspect ratio represented by (b/a) is equal to or higher than 0.5 and is equal to or lower than 3.0 in a case in which an interval between the plurality of modified regions formed to line up along the first direction is defined as a (μm) and an interval between the plurality of modified regions formed to line up along the second direction by relatively moving the plurality of focal points and the workpiece along the second direction is defined as b (μm).

8. The manufacturing method of a wafer according to claim 1, wherein the laser beam applied to the workpiece in the separation layer forming step is applied to the workpiece in a burst mode.

9. A manufacturing method of a wafer for manufacturing the wafer having a thickness smaller than a distance between a first surface and a second surface from a workpiece that is an ingot of gallium nitride or a single-crystal substrate of gallium nitride having the first surface and the second surface located on an opposite side to the first surface, the manufacturing method comprising:

a holding step of sucking and holding the second surface of the workpiece;

a separation layer forming step of, after the holding step, forming a separation layer in the workpiece by relatively moving, along a predetermined direction, the workpiece and a focal point of a pulsed laser beam having such a wavelength as to be transmitted through the workpiece in a state in which the first surface is irradiated with the laser beam from an opposite side to the second surface and the focal point is positioned at a predetermined depth position in the workpiece; and a separation step of separating the wafer from the workpiece by using the separation layer as a point of origin after the separation layer forming step, and wherein the manufacturing method further comprises a circular annular processing step of forming the separation layer in an outer circumferential region of the workpiece by positioning the focal point at the predetermined depth position and executing irradiation with the laser beam in a circular annular manner along an outer circumferential edge of the workpiece after the holding step and before the separation layer forming step.

10. The manufacturing method of a wafer according to claim 9, wherein, in the separation layer forming step, after the workpiece and the focal point are relatively moved in a regular hexagonal manner along the predetermined direction, the focal point is moved toward a center of the workpiece in a radial direction and then the workpiece and the focal point are relatively moved in a regular hexagonal manner along the predetermined direction.

11. A manufacturing method of a wafer for manufacturing the wafer having a thickness smaller than a distance between a first surface and a second surface from a workpiece that is an ingot of gallium nitride or a single-crystal substrate of gallium nitride having the first surface and the second surface located on an opposite side to the first surface, the manufacturing method comprising:

a holding step of sucking and holding the second surface of the workpiece;

a separation layer forming step of, after the holding step, forming a separation layer in the workpiece by relatively moving, along a predetermined direction, the workpiece and a focal point of a pulsed laser beam having such a wavelength as to be transmitted through the workpiece in a state in which the first surface is irradiated with the laser beam from an opposite side to the second surface and the focal point is positioned at a predetermined depth position in the workpiece; and a separation step of separating the wafer from the workpiece by using the separation layer as a point of origin after the separation layer forming step, and wherein, in the separation layer forming step, a second direction orthogonal to a first direction is employed as the predetermined direction while the laser beam is split into a plurality of laser beams and respective focal points of the plurality of laser beams are disposed to line up along the first direction.

12. The manufacturing method of a wafer according to claim 11, wherein, in the separation layer forming step, after the plurality of focal points are moved along the second direction, the plurality of focal points are moved along the second direction in a state in which the plurality of focal points are shifted along the first direction to partly overlap with a movement region including a locus of the movement of the plurality of focal points in the second direction as viewed from the first surface.

13. The manufacturing method of a wafer according to claim 11, wherein:

an interval of the plurality of focal points that line up along the first direction is equal to or longer than 5 μm and is equal to or shorter than 20 μm in the separation layer forming step.

14. The manufacturing method of a wafer according to claim 13, wherein:

the separation layer formed in the separation layer forming step includes a plurality of modified regions, and an aspect ratio represented by (b/a) is equal to or higher than 0.5 and is equal to or lower than 3.0 in a case in which an interval between the plurality of modified regions formed to line up along the first direction is defined as a (μm) and an interval between the plurality of modified regions formed to line up along the second direction by relatively moving the plurality of focal points and the workpiece along the second direction is defined as b (μm).

15. The manufacturing method of a wafer according to claim 11, wherein the laser beam applied to the workpiece in the separation layer forming step is applied to the workpiece in a burst mode.

16. The manufacturing method of a wafer according to claim 9, wherein the laser beam applied to the workpiece in the separation layer forming step is applied to the workpiece in a burst mode.

* * * * *